(12) United States Patent
Yang et al.

(10) Patent No.: US 11,657,565 B2
(45) Date of Patent: *May 23, 2023

(54) HIDDEN CULLING IN TILE-BASED COMPUTER GENERATED IMAGES

(71) Applicant: Imagination Technologies Limited, Kings Langley (GB)

(72) Inventors: Xile Yang, Rickmansworth (GB); John W. Howson, St. Albans (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,352

(22) Filed: Oct. 29, 2021

(65) Prior Publication Data

US 2022/0122314 A1    Apr. 21, 2022

Related U.S. Application Data

(63) Continuation of application No. 16/849,125, filed on Apr. 15, 2020, now Pat. No. 11,182,952, which is a continuation of application No. 16/441,824, filed on Jun. 14, 2019, now Pat. No. 10,665,009, which is a continuation of application No. 15/793,343, filed on Oct. 25, 2017, now Pat. No. 10,366,530, which is a (Continued)

(30) Foreign Application Priority Data

Dec. 20, 2012 (GB) ..................................... 1223089

(51) Int. Cl.
*G06T 15/40* (2011.01)
*G06T 15/00* (2011.01)

(52) U.S. Cl.
CPC .......... *G06T 15/405* (2013.01); *G06T 15/005* (2013.01)

(58) Field of Classification Search
None
See application file for complete search history.

(56) References Cited

U.S. PATENT DOCUMENTS

| | | |
|---|---|---|
| 5,729,672 A | 3/1998 | Ashton |
| 5,867,166 A | 2/1999 | Myhrvold et al. |
| 6,084,591 A | 7/2000 | Aleksic |

(Continued)

FOREIGN PATENT DOCUMENTS

EP    1659538 B1    1/2008

*Primary Examiner* — Andrew G Yang
(74) *Attorney, Agent, or Firm* — Potomac Law Group, PLLC; Vincent M De Luca

(57) ABSTRACT

A method and system is provided for culling hidden objects in a tile-based graphics system before they are indicated in a display list for a tile. A rendering space is divided into a plurality of regions which may for example be a plurality of tiles or a plurality of areas into which one or more tiles are divided. Depth thresholds for the regions, which are used to identify hidden objects for culling, are updated when an object entirely covers a region and in dependence on a comparison between a depth value for the object and the depth threshold for the region. For example, if the depth threshold is a maximum depth threshold, the depth threshold may be updated if an object entirely covers the tile and the maximum depth value of the object is less than the maximum depth threshold.

20 Claims, 9 Drawing Sheets

Related U.S. Application Data continuation of application No. 14/135,278, filed on Dec. 19, 2013, now Pat. No. 9,805,500.

(56) References Cited

U.S. PATENT DOCUMENTS

| | | | |
|---|---|---|---|
| 6,229,553 B1 | 5/2001 | Duluk et al. |
| 6,246,415 B1 | 6/2001 | Grossman et al. |
| 6,348,919 B1 | 2/2002 | Murphy |
| 6,380,935 B1 | 4/2002 | Heeschen et al. |
| 6,407,736 B1 | 6/2002 | Regan |
| 6,480,205 B1 | 11/2002 | Greene et al. |
| 6,593,929 B2 | 7/2003 | Hook et al. |
| 6,636,212 B1 | 10/2003 | Zhu |
| 6,697,063 B1 | 2/2004 | Zhu |
| 6,717,576 B1 | 4/2004 | Duluk et al. |
| 7,102,646 B1 | 9/2006 | Rubinstein et al. |
| 7,170,513 B1 | 1/2007 | Voorhies et al. |
| 7,310,100 B2 | 12/2007 | Hussain |
| 7,324,115 B2 | 1/2008 | Fraser |
| 7,405,734 B2 | 7/2008 | Foran |
| 7,450,120 B1 | 11/2008 | Hakura et al. |
| 8,441,496 B1 | 5/2013 | Maguire |
| 8,669,987 B2 | 3/2014 | Redshaw |
| 8,686,998 B2 | 4/2014 | Morphet |
| 2002/0196252 A1 | 12/2002 | Liao et al. |
| 2003/0025695 A1 | 2/2003 | Morphet |
| 2005/0195187 A1* | 9/2005 | Seiler ............... G06T 15/405 |
| | | | 345/422 |
| 2007/0146378 A1 | 6/2007 | Sorgard et al. |
| 2008/0068375 A1 | 3/2008 | Min et al. |
| 2008/0273033 A1 | 11/2008 | Brennan |
| 2009/0066694 A1 | 3/2009 | Redshaw et al. |
| 2010/0020090 A1 | 1/2010 | Langtind et al. |
| 2010/0265254 A1 | 10/2010 | Liland et al. |
| 2011/0227936 A1 | 9/2011 | Redshaw |
| 2011/0304608 A1 | 12/2011 | Yang |
| 2012/0212488 A1 | 8/2012 | Yu et al. |
| 2012/0299910 A1* | 11/2012 | Liang ............... G06T 15/405 |
| | | | 345/419 |
| 2013/0265298 A1 | 10/2013 | Moon et al. |

* cited by examiner

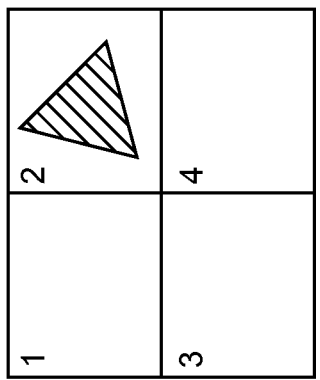
FIG. 5A
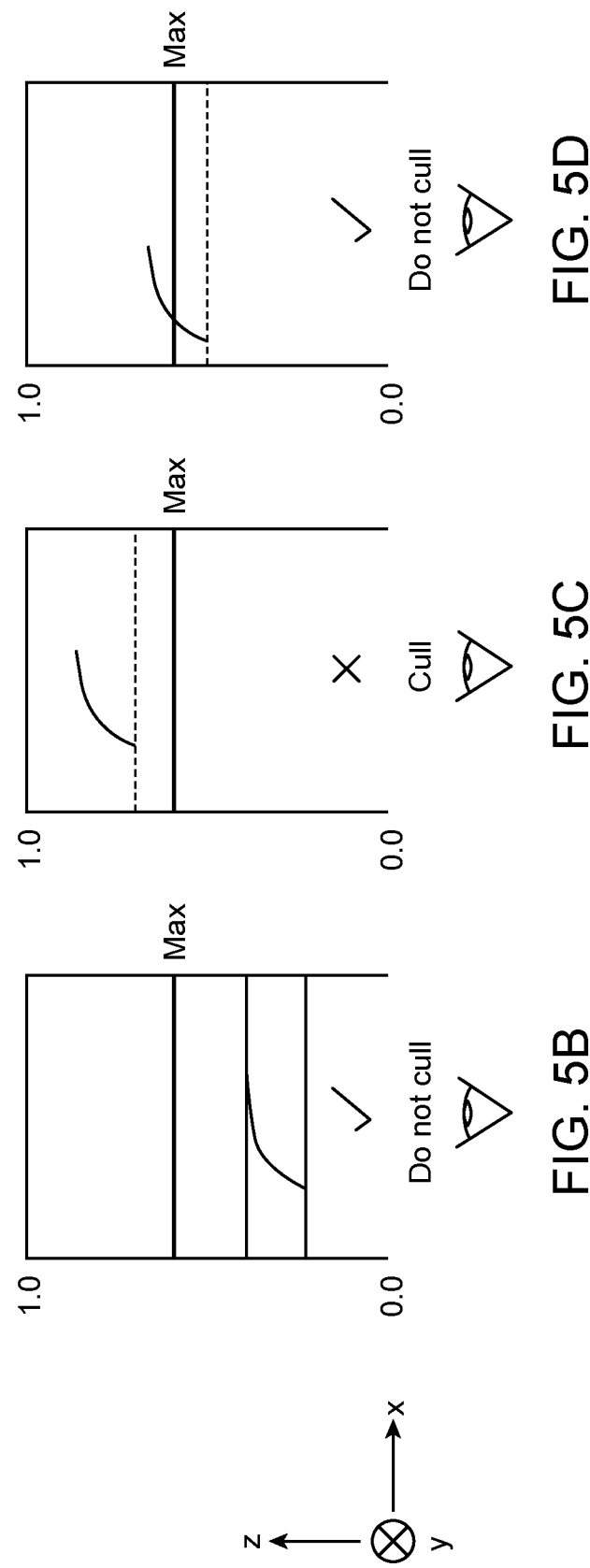
FIG. 5B
FIG. 5C
FIG. 5D

HIDDEN CULLING IN TILE-BASED COMPUTER GENERATED IMAGES

FIELD OF INVENTION

The present invention relates to a method and system for culling non-visible objects in a tile based computer generated graphics system.

BACKGROUND TO THE INVENTION

Tile based rendering is a known technique for rendering 2D or 3D computer graphics images. A rendering space is sub-divided into a plurality of regions called tiles or blocks, which are typically rectangular, and each comprises a plurality of pixels. The rendering space may correspond to an image for display on a screen, but other render targets, such as texture data in memory, are also possible. Tiles can be various sizes, but a typical size is for example 16×16 pixels. In a high screen resolution image there are typically 1280× 1024 pixels. Therefore, a high screen resolution image may be sub-divided into 5120 tiles (each comprising 16×16 pixels).

Primitive data representing geometrical objects is read from memory and transformed into screen space. Primitives are often polygons, typically triangles, but may be lines or points. A display list is then derived, for each tile, indicating the primitives, if any, which are located either partially or wholly within the tile. The display lists may include identifiers for each of the primitives which reference or provide a pointer to geometrical data associated with the primitive stored in a parameter memory. Where a primitive is located over more than one tile, this avoids having to store geometrical data for that primitive multiple times. However, it will be appreciated that, particularly as computer graphics images have become more complex, a large amount of data must still be stored in the display lists for the tiles in order to indicate all of the primitives located within each tile. A large amount of data must also be stored in the parameter memory.

After the display lists have been created, each tile is rendered independently using its display list.

It is known to perform hidden surface removal, such that further texture and shading is only applied to visible surfaces.

Hidden surface removal typically uses a technique known as "z-buffering". For each tile, the geometrical data for each of the primitives identified in the display list is read, and depth values are calculated for each primitive at every pixel in the tile covered by the primitive. Processing each primitive in turn, these depth values are compared to the respective depth values stored for each of the pixels in a "z buffer". If it is determined that a new primitive is closer to the viewpoint or eye at one or more pixels than the previously processed primitives, then the pixel values, including the depth value, stored for each of those pixels is replaced with the values of the new primitive at the respective pixel. If it is determined that a new primitive is hidden or obscured behind other primitives in the image at one or more pixels, then the pixel values, including the depth value, for each of those pixels is not changed. Once all of the primitives have been processed, the resultant pixel data for visible primitives is passed to a shading unit which applies textures and shading to each visible pixel within a primitive. After final pixel values have been determined for each pixel in the tile, the pixel data for the tile is written to memory for display on an output device.

Methods for culling primitives which are entirely hidden (that is primitives which are not visible at any pixels in the tile) without having to perform all of the processing required by the "z-buffering" hidden surface removal technique for all visible pixels from the primitive are known. For example, GB patent No. GB 2,378,108 discloses a technique where depth values of the primitives are first compared with the range of per pixel depth values from previously processed primitives stored in the "z buffer".

By way of example, FIGS. 1 and 2 show the depth range of per pixel depth values from previously processed primitives and a new primitive indicated by reference numerals 10 and 20 respectively. In this illustrative example, only the x and z directions are considered, for clarity. In these diagrams, the furthest point from the viewpoint is assigned the depth value 1.0, and the closest point the depth value 0. The depth values of each pixel in the tile stored in the "z buffer" are indicated by a solid line. The depth range of the previously processed primitives (that is, the greatest or maximum depth from and the closest or minimum depth to the viewpoint) is illustrated by two dotted lines. In this example, in FIG. 1, new primitive 10 is closer to the viewpoint than the maximum depth of the z range. This primitive is therefore not culled and is processed using the "z-buffering" technique described above. FIG. 2 shows how the depth values stored for each of the pixels in the tile are updated. Since in this example primitive 10 is visible at all of the pixels at which it is located, the depth values for each of the pixels covered by primitive 10 are replaced with the depth value of primitive 10 at the respective pixel. If primitive 10 were only visible at one or more pixels, then only the depth values for those pixels would be replaced with the depth value of primitive 10 at the respective pixel. It will be noted that, in this example, this means that the z range has changed, and in particular the maximum depth of the z range is now closer to the viewpoint. New primitive 20 is now processed and, as illustrated in FIG. 2, the minimum depth of new primitive 20 is greater than the maximum depth of the updated depth range. Thus, new primitive 20 is entirely hidden by other primitives in the tile and can therefore be culled without processing the primitive further.

This method has the advantage that primitives which are known to be entirely hidden by other primitives located within the tile can be culled without having to perform all of the processing required by the "z-buffering" technique for each visible pixel from the primitives. However, those primitives are still indicated in the display lists for the tiles. This means that memory space is used unnecessarily storing an indication of those primitives in the display lists for the tiles. In addition, geometrical data associated with those primitives may be unnecessarily stored in the parameter memory. Memory bandwidth is also therefore wasted reading data for those primitives from the display list/parameter memory in order to process those primitives.

GB patent GB 2,378,108 proposes that hidden primitives may be culled before they are indicated in the display lists for the tiles, if a technique called "partial rendering" is used. In this technique, only a portion of the primitives located within a tile are indicated in the display list for that tile, and then those primitives are rendered as described above using the z buffering technique. The z range of the depth values stored in the "z buffer" after the "partial render" is fed back to the unit performing the tiling. The tiling unit then compares the depths of the next primitives to be indicated in the display list for that tile with this z range information as described above and culls any primitives which are determined to be entirely hidden by other primitives in the tile.

This method enables some primitives which will be hidden in the image to be culled before they are indicated in the display lists for the tiles. However, "partial rendering" is a fall-back method used by a tile based computer graphics system when it runs out of parameter memory before finishing processing all the primitives in a render (for example the system has to render part of the display list to free parameter memory, thereby enabling new primitives to be added to the display list). Partial rendering is slow and expensive for hardware and is avoided if possible. Furthermore, it will be appreciated that this method is not as accurate as performing the depth test after the display lists have been derived, during rendering of the tiles, since the z range information with which the depths of the primitives are compared is not as up-to-date. The z range is only updated after each partial render. This method cannot be used with tile based systems which do not use "partial rendering" or a system where at least some primitives located within a tile are rendered before all of the primitives located within the tile are indicated in the display list for that tile.

SUMMARY OF INVENTION

According to the present invention there is provided a method for culling non-visible objects in a tile-based graphics system, comprising the steps of: subdividing a rendering space into a plurality of regions, each comprising a plurality of pixels; deriving a depth value for an object; reading a depth threshold for a region from a memory; performing a comparison between the depth value for the object and the depth threshold for the region; determining whether the object entirely covers the region, and, if so, updating the depth threshold for the region in dependence on the comparison; and determining whether to cull a subsequent object based on the depth threshold for the region such that the subsequent object is not indicated in a display list.

This method has the advantage that it can be used to cull non-visible or hidden objects in a tile-based graphics system before they are stored in a display list, without requiring the tile-based graphics system to perform "partial rendering". It will be appreciated that the depth thresholds updated according to embodiments of the present invention are likely to be conservative values, since the depth thresholds are updated (so as to improve the depth cull) only when an object entirely covers a region. However, the applicant has appreciated that this method advantageously provides a relatively effective depth cull for a relatively small amount of processing power, which means that it is particularly suited for use during tiling where it is undesirable to repeat all of the processing which will be carried out by the renderer.

The invention is based on the principle that, if an object entirely covers a region, it can be deduced (taking for example the case where objects are culled if they are located beyond a maximum depth threshold) that the maximum depth threshold for that region cannot be greater (i.e. further from the viewpoint) than the maximum depth value for that object.

In a first embodiment the step of performing a comparison between the depth value for the object and the depth threshold for the region comprises performing a comparison between a maximum depth value for the object and a maximum depth threshold for the region; and the step of updating the depth threshold for the region in dependence on the comparison comprises updating the maximum depth threshold for the region if the maximum depth value for the object is less than the maximum depth threshold for the region.

The maximum depth threshold for the region is preferably updated to the maximum depth value for the object. However, it will be appreciated that some advantage can still be gained if the maximum depth threshold is updated by a smaller amount (to value between the previous maximum depth threshold and the maximum depth value for the object).

In this case, the step of determining whether to cull a subsequent object based on the depth threshold for the region such that the subsequent object is not indicated in a display list may comprise comparing a minimum depth value for the subsequent object to the maximum depth threshold for the region.

Alternatively, in a second embodiment, the step of performing a comparison between the depth value for the object and the depth threshold for the region comprises performing a comparison between a minimum depth value for the object and a minimum depth threshold for the region; and the step of updating the depth threshold for the region in dependence on the comparison comprises updating the minimum depth threshold for the region if the minimum depth value for the object is greater than the minimum depth threshold for the region.

In this case, the step of determining whether to cull a subsequent object based on the depth threshold for the region such that the subsequent object is not indicated in a display list may comprise comparing a maximum depth value for the subsequent object to the minimum depth threshold for the region.

In the first embodiment mentioned above, the method may further comprise the steps of: performing a comparison between a minimum depth value for the object and a minimum depth threshold for the region; and updating the minimum depth threshold for the region if the minimum depth value for the object is less than the minimum depth threshold for the region to a value equal to or less than the minimum depth value for the object.

In the second embodiment mentioned above, the method may further comprise the steps of: performing a comparison between a maximum depth value for the object and a maximum depth threshold for the region; and updating the maximum depth threshold for the region if the maximum depth value for the object is greater than the maximum depth threshold for the region to a value equal to or greater than the maximum depth value for the object.

These methods have the advantage that the present invention can be used in a system which supports culling of objects using either a maximum depth threshold or a minimum depth threshold for the region depending on the depth cull condition associated with each object, as will be described in more detail later.

The object may comprise a single primitive. Alternatively, and more preferably, the object may comprise a plurality of primitives or a patch of surface data. If the object comprises multiple primitives or a patch of surface data, the object is likely to be larger, and therefore more likely to entirely cover at least one of the regions. This means that the depth thresholds for the regions may, in turn, be updated more frequently, and so subsequent depth tests (based on the updated depth thresholds) are more likely to result in a cull.

In one embodiment, the step of deriving a depth value for the object comprises, for each region within which the object is located, deriving a depth value for the respective part of the object within that region. This embodiment has the advantage that, where an object covers more than one region, by comparing the depth threshold for each region to the depth value for the part of the object within that region, the depth thresholds for the regions are more likely to be updated, and by a larger amount. This in turn enables the depth cull based on those thresholds to be improved.

The plurality of regions may be a plurality of tiles.

Alternatively, the plurality of regions may comprise a plurality of areas into which a tile is subdivided. This embodiment has the advantage that, since the regions are smaller, an object is more likely to entirely cover at least one of the regions. This, in turn, means that the depth thresholds for the areas are likely to be updated more frequently, and so the depth cull can be improved. Thus, this embodiment may improve the depth cull. Although at the cost of increasing the amount of processing required to perform the depth cull, and in particular the amount of memory space required to store depth thresholds.

In this embodiment, the step of determining whether to cull a subsequent object based on the depth threshold for the region such that the subsequent object is not located in a display list may comprise determining whether to cull a subsequent object based on the depth threshold for each of the areas of the tile within which the subsequent object is located. This step may comprise, for each of the areas of the tile within which the subsequent object is located, comparing a depth value for the subsequent object to the depth threshold for that area.

In a preferred embodiment, this method further comprises the steps of: determining a depth threshold for the tile based on the depth threshold for each of the areas of the tile; and writing the depth threshold for the tile to a memory.

This may comprise determining the greatest of the depth thresholds for the areas of the tile; and setting the depth threshold for the tile to a value equal to or greater than the greatest of the depth thresholds for the areas of the tile, or determining the smallest of the depth thresholds for the areas of the tile; and setting the depth threshold for the tile to a value equal to or smaller than the smallest of the depth thresholds for the areas of the tile.

In a further embodiment, a first plurality of the plurality of areas is a plurality of sub areas into which a first portion of the tile is subdivided; and the method further comprises the steps of: determining a depth threshold for the first portion of the tile based on the depth threshold for each of the sub areas; and writing the depth threshold for the first portion of the tile to a memory.

These embodiments have the advantage that the depth thresholds for the areas of the tile may be deleted or overwritten without losing all of the information contained therein. This means that the effectiveness of the depth cull may be improved whilst limiting the amount of memory space required to tile an image, in particular an image comprising a plurality of tiles. In a preferred embodiment, depth thresholds are stored for each of a plurality of tiles, but depth thresholds for areas of the tiles are only stored at any one time for a subset of the tiles.

As described above, primitives are typically processed sequentially. In general, one does not know which tile a primitive will be located within until it is processed. However, the applicant has appreciated that primitives derived from a mesh, for example a patch of surface data or a triangular polygon, are likely to be located in a local region. This means that consecutively processed primitives derived from a mesh may be located in the same tile, and so may be used to update the maximum depth thresholds for different areas of a particular tile. This, as well as improving any depth cull based on those areas, means that it is more likely that all of the maximum depth values for areas of a particular tile will be updated and so that these can be used to update the maximum depth value for the tile. In turn, this means that the depth thresholds for those areas may be evicted from a tile without losing all of the information contained therein.

The depth thresholds for the areas may be written to and stored in a memory device for temporarily storing data, which for example may act a little like a cache.

Where for example an object is located in a new tile, the depth thresholds for the areas of a tile presently in the memory device may be evicted from the memory device on a first in first out policy. However, more preferably, the depth thresholds for the areas are evicted from the memory device in dependence on how many of the depth thresholds for the areas have been updated and or on the difference between the depth thresholds for the areas. This reduces the amount of data which is lost when depth thresholds for the areas of a tile are evicted from the memory device.

According to the present invention there is also provided a corresponding apparatus.

BRIEF DESCRIPTION OF THE FIGURES

Embodiments of the invention will now be described by way of example only with reference to the accompanying Figures in which:

FIGS. 5A-D is a diagram illustrating how it is determined which primitives are to be culled in an embodiment of the invention;

DETAILED DESCRIPTION

The term "object" is used in the following to describe a graphical element such as a primitive or a model generally referred to within the computer graphics industry as a "patch" of surface data. A "patch" is typically a parametric function defined by a set of control points which describe the shape of a curve with respect to parameter "t" (for a curved line) or domain coordinates 'u,v' (for a curved surface). One example of a patch used in computer graphics is a Bezier patch, but others exist as will be appreciated by a person skilled in the art. Tessellation is a technique which involves breaking up a model or "patch" into a plurality of tessellated primitives. A patch is typically split into multiple primitives which may then be displaced by a function and/or in dependence on a displacement height map to create a plurality of tessellated primitives.

As will be known to those skilled in the art, tessellation of patches of surface data in a graphics pipeline can be supported by a number of application programming interfaces (APIs), for example, Microsoft® Direct3D® 11 API. Microsoft® Direct3D® 11 API supports displacement mapping, whereby the tessellated primitives may be at a displaced location from the surface of the patch.

The examples below are illustrated in the context of a graphics system in which a depth compare mode of "less than" is being used. In other words, objects are visible at points where their depth is less than that of other objects at that point. However, it will be understood that graphics systems can use a variety of different depth compare modes, and interchange between them. Other example depth compare modes include "greater than", "greater than or equal", "less than or equal", "equal", "not equal", "always", and "never". The example of a "less than" depth compare is merely used for clarity, and the techniques below can be readily applied for any suitable depth compare mode.

Figure 2:
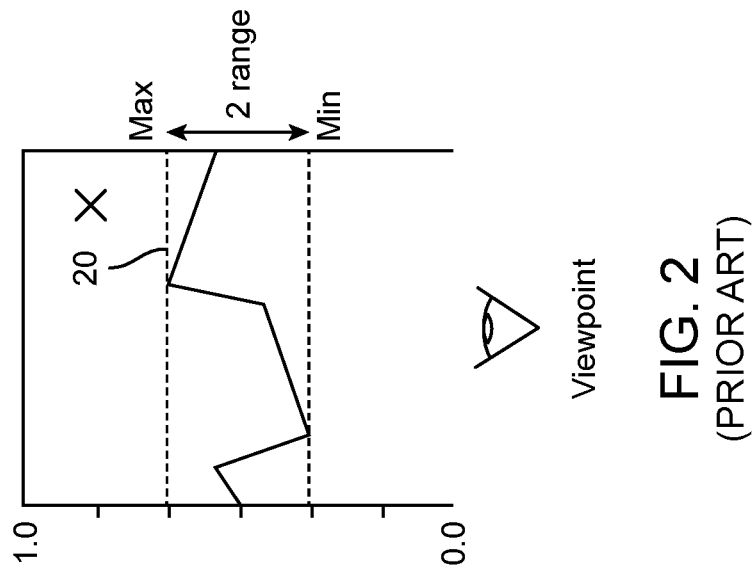
FIG. 2 illustrates a method for culling hidden primitives in the prior art.
Figure 1:
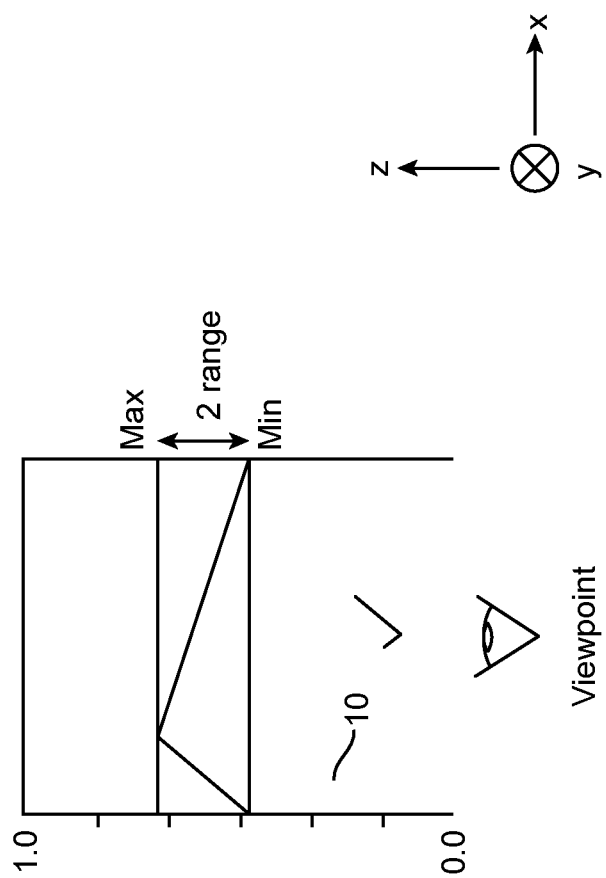
FIG. 1 illustrates a method for culling hidden primitives in the prior art.
Figure 3:
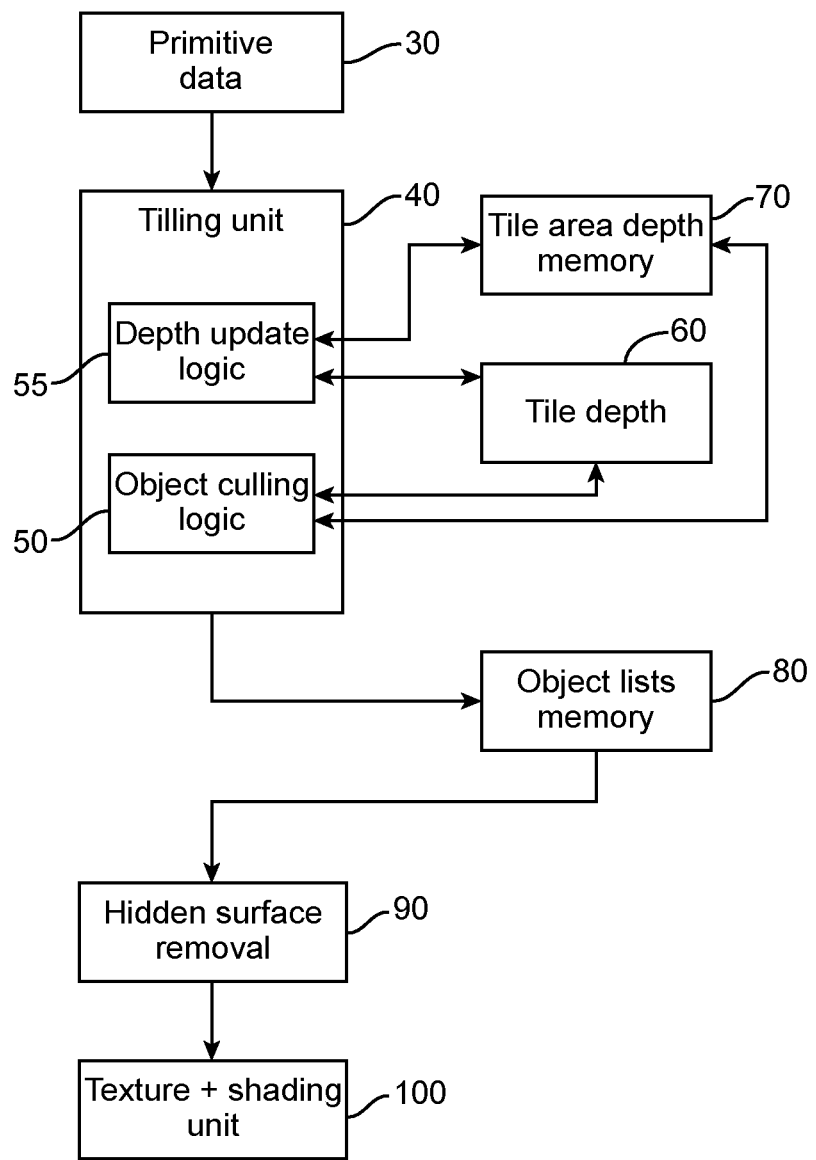
FIG. 3 is a schematic diagram showing apparatus for generating an image in a tile based computer graphics system in a preferred embodiment of the invention.

FIG. 3 is a schematic diagram showing an apparatus for generating an image in a tile based computer graphics system in a preferred embodiment of the invention. The parts that comprise this apparatus may be implemented as circuits in a processor such as a graphics processor unit (GPU), or may be implemented as a program running on a programmable device such as a GPU or CPU. In this preferred embodiment, the "rendering space" is an image. However, the "rendering space" may comprise other rendering targets such as, for example, texture data in memory.

Object data 30 is passed to a tiling unit 40. Objects may be read from memory or objects may be derived from geometry data. For example, some of the objects may be primitives, patches, tessellated primitives derived by tessellating a patch of surface data, or any combination thereof.

Tiling unit 40 comprises object culling logic 50 and depth update logic 55, which are coupled to a tile depth memory device 60. In this embodiment, object culling logic 50 and depth update logic 55 are also coupled to a tile area depth memory device 70, which can act in a similar manner to a cache for temporarily storing tile area depth information or data, as described in more detail below.

Figure 4:
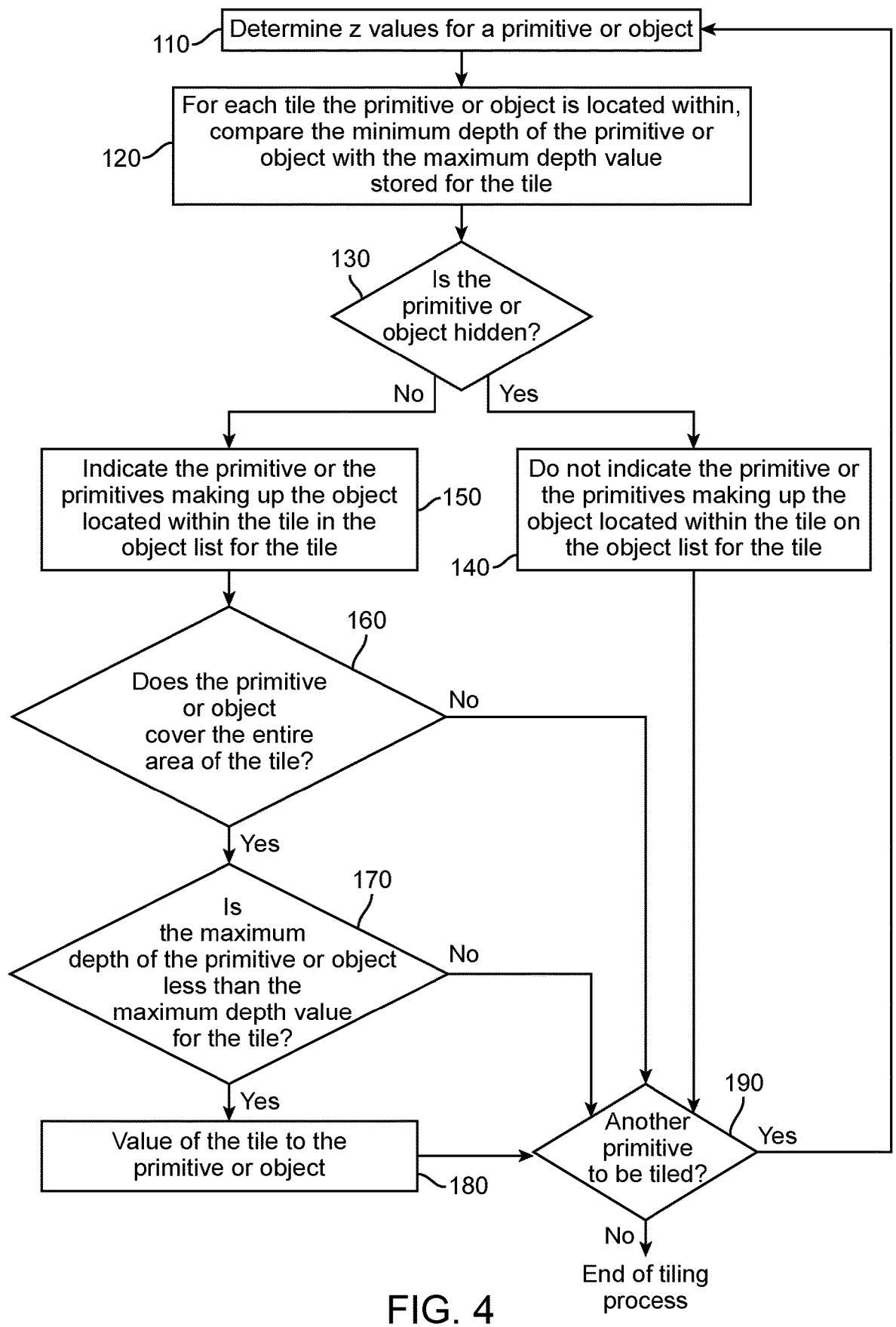
FIG. 4 is a flow chart showing an embodiment of the invention.

FIG. 4 is a flow chart illustrating the steps performed by the object culling logic 50 and depth update logic 55 according to an embodiment of the present invention.

First, tiling unit 40 divides the screen-space viewport image into a plurality of regions called tiles, each comprising a plurality of image pixels. Tiles are typically rectangular but can be other shapes. Typically, for each tile, the tiling unit 40 then determines whether each of the objects is located at least partially within that tile. That is, whether at least part of the object is located within a viewable region of the tile. Each object is processed in turn. This can be done using a number of known techniques.

At step 110, for each object, a depth value representing the maximum depth of the object (that is, the greatest depth of the object from the eye or viewpoint) and a depth value representing the minimum depth of the object (that is, the depth of the object closest to the eye or viewpoint) is determined. These depth values may be determined in a number of ways, as will be appreciated by those skilled in the art, and may be determined before or after the tiling unit has determined which tile(s) the object is located within.

For example, if the object is a primitive, depth values for a primitive may be determined by analysing the vertices of the primitive, as will be understood by the skilled person. To determine depth values for an object comprising a plurality of primitives, a bounding volume which encloses the object may be determined, from which minimum and maximum depth values can be determined using known techniques. Bounding volumes can be many shapes, for example spheres, cylinders or rectangular boxes. Many of the surface patches used in computer graphics, such as Bezier and B-spline types, have the property that they lie completely within the convex hull of their control points. A bounding volume may therefore be determined for these patches prior to tessellation. It will be appreciated that the accuracy of the depth values determined for the object will depend on how closely the bounding volume surrounds the enclosed object. Other methods for determining depth values for a primitive or object exist and will occur to those skilled in the art.

In another example, the object may be a tessellated patch of surface data comprising a plurality of tessellated primitives. In this case, the minimum and maximum depth values may be determined by calculating and comparing the depths of each of the tessellated primitives.

Depth values can be determined for an entire object. However, it is possible, particularly where an object is large and extends over several tiles or it crosses one or more tile boundaries, that depth values may be calculated for each of the respective parts of the object located within each tile. It will be appreciated that in this case the depth values are determined after the tiling unit 40 has determined which tile each primitive making up the object is at least partially located within.

For each object which is at least partially located within the tile, the depth range of the object in the tile can be determined by calculating the depth values at selected intersection points between the object and the tile boundaries. The intersection points can comprise one or more of: corner points of tile boundaries inside the object; vertices of the object inside the tile; and intersection points of object edges with tile boundaries. The depth range of an object such as a tessellated patch, in the tile is determined by the bounding volume of the parts of the object within the tile boundaries. This can be done by determining the depth ranges of the tessellated primitives within the tile using the intersection points.

After depth values for the object are determined, at step 120, for each tile the object is located at least partially within, a depth value for the object is compared to a depth threshold for the tile presently stored in tile depth memory device 60 in accordance with the depth compare mode.

For example, in the illustrative case of a depth compare mode of "less than", the minimum depth value for the object is compared to the maximum depth threshold for the tile presently stored in tile depth memory device 60. Where depth values have been calculated for the object in the tile, the minimum depth value of the part of the object located within the tile is compared to the maximum depth threshold for that tile. How the maximum depth threshold for the tile is determined will be described in detail later.

If it is determined at step 130 that the minimum depth value for the object indicates or represents a greater depth than the maximum depth threshold for the tile (that is, a depth further from the viewpoint), then the object will be entirely hidden (according to this depth compare mode) and is culled. At step 140, the primitive or the primitives making up the part of the object located within that tile are not indicated in the display list for that tile. In addition, geometrical data associated within that primitive or those primitives may not be stored in parameter memory (depending on whether the primitive or object is determined to be visible in other tiles).

If it is determined in step 130 that the minimum depth value for the object is equal to or closer to the viewpoint than the maximum depth threshold for the tile, then at step 150 the primitive or primitives making up the part of the object located at least partially within the tile are indicated in the display list for that tile. Geometrical data associated with that primitive or those primitives is also stored in parameter memory. Note that the geometrical data may be data associated with each indicated primitive or, for example where the object is a tessellated patch of surface data, the geometrical data may be data associated with the patch of surface data, for example the control points of the patch and the tessellation factors, from which the indicated tessellated primitives can be subsequently re-derived during rendering.

FIGS. 5A-5D illustrate three possible scenarios of a depth test with a depth compare mode of "less than". For ease of illustration, a screen-port image 200 is divided into four, equal rectangular tiles. A new object is illustrated in the top right hand side tile (tile 2). FIGS. 5B to 5D illustrate the maximum depth threshold of that tile. The furthest point from the viewpoint is assigned the depth value 1.0 and the closest point the depth value 0. The maximum depth threshold for the tile is indicated by a bold line. The minimum depth value of the object is indicated by a dotted line. In the first example, in FIG. 5B, the object is closer to the viewpoint than the maximum depth threshold of the tile. This object may therefore be visible. In this example, the object is not culled. In the second example, in FIG. 5C, the minimum depth value for the object is greater (i.e. further from the viewpoint) than the maximum depth threshold for the tile. In this example, the object is therefore entirely hidden and can be culled. In the last example, in FIG. 5D, the maximum depth of the object is greater than the maximum depth for the tile. However, the minimum depth of the object is not. Thus, it cannot be known whether the object will be visible in the image. This will depend on the depth values at the respective pixels in the tile. In this example, the object is therefore not culled.

How the maximum depth threshold for the tile is determined by the depth update logic 55 for a "less than" depth compare mode will now be explained, referring back to FIG. 4. It is determined at step 170 whether the maximum depth value of the object indicates a depth closer to the viewpoint than the maximum depth threshold stored for the tile. For example, referring back to FIG. 5, this is the case in FIG. 5B but not in FIG. 5C or 5D. If the maximum depth value of the object is closer to the viewpoint than the maximum depth threshold stored for the tile, then at step 160 it is determined whether the object covers the entire tile. That is, whether all the corner points of the tile boundaries are located inside the object. In some examples, the corner points can be corner pixel sample points, and in other examples the corner points can be halfway points between pixel sampling points, or any other set of corner points that gives a more conservative test than the corner sample points. If the object covers the entire tile, then at step 180, the maximum depth value of the object is written to tile depth memory 60 to replace or update the maximum depth threshold stored for the tile. Alternatively, it will be appreciated that steps 160 and 170 may be performed in the opposite order or in parallel.

Thus, in the example of FIG. 5B, the maximum depth threshold for the tile will not be updated, since object 210 does not cover the entire area of the tile. This is because one cannot know whether the visible objects which are not overlapped by object 210 have a greater depth than object 210, since individual depth values for each of the pixels are not known.

Figure 6A:
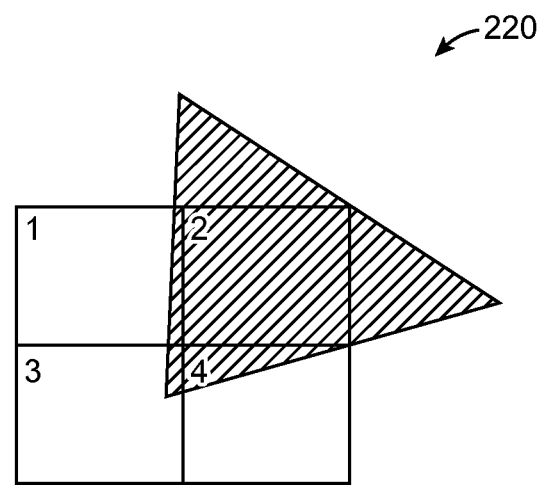
FIG. 6A-C is a diagram illustrating how the maximum depth value for a tile may be updated in an embodiment of the invention.
Figures 6B, 6C:
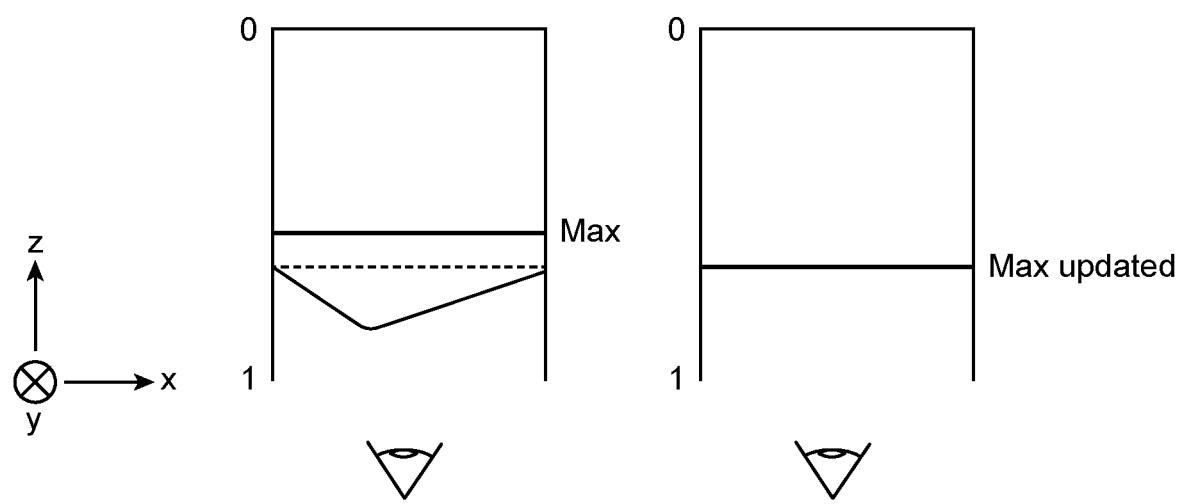

FIG. 6A illustrates an example where an object 220 has a maximum depth closer to the viewpoint than the depth indicated by the maximum depth threshold stored for the tile and covers the entire tile. FIG. 6B shows the depth of object 220 in relation to the maximum depth threshold of the tile before it has been updated. Again, the furthest point from the viewpoint is assigned the depth value 1.0 and the closest point the depth value 0. The maximum depth threshold of the tile is indicated by a bold line. The maximum depth of object 220 is indicated by a dotted line. FIG. 6C shows how the maximum depth threshold of the tile is updated to the maximum depth value of object 220. It will be appreciated that, since the maximum depth threshold of the tile is now closer to the viewpoint than before, it is more likely that subsequent primitives can be culled.

Referring back to FIG. 4, at step 190, it is determined whether there is another object to be tiled and, if so, the process is repeated for the next object. This process is repeated until all of the objects have been processed and either indicated in the display list for the tile or culled. Note that the operations performed by the object culling logic 50 and depth update logic 55 in FIG. 4 may be performed in any order or in parallel.

Note that, in one example, the object 220 of FIG. 6A may be a single primitive covering the tile, or, in an alternative example, object 220 may instead be an object comprising a plurality of primitives for example a tessellated patch of surface data. Objects comprising a plurality of primitives are more likely to cover the entire tile, and therefore if such objects are used in the depth test the maximum depth threshold for the tile may be updated more frequently. This, in turn, means that it may be possible to cull more subsequent objects from the tile.

Once all of the primitives have been processed, referring back to FIG. 3 the display lists are preferably compressed, and stored in memory device 80.

The display lists are subsequently read and the indicated primitives are passed to a hidden surface removal unit 90 which processes each pixel from the primitives to remove any hidden pixels on the surfaces. The resultant pixel data for visible objects is then passed to a texture and shading unit 100 which applies pixel or texture shading using well known techniques. The final pixel values are written to memory (not shown) for display on an output device (not shown).

The above embodiment is described in respect of a system where objects with lesser depth values are determined to be closer to the viewpoint than objects with greater depth values and are therefore rendered in preference. To achieve this, the hidden surface removal system is typically operated with a "less than" depth compare mode, and culling may occur for objects with a depth value greater than a maximum depth threshold for the tile. In an alternative embodiment the depth scale is inverted such that objects with greater depth values are determined to be closer to the viewpoint than objects with lesser depth values. For equivalent rendering behaviour the hidden surface removal system is operated with a "greater than" depth compare mode, and the culling operation is modified accordingly. For example, for the object culling operation of FIG. 4, if the depth compare mode is set to "greater than", then an object is culled if the maximum depth value for an object is less than the minimum depth threshold for the tile.

Similarly, for the depth threshold update operation of FIG. 4, a system operating entirely with a depth compare mode of "greater than" is adapted to maintain the minimum depth threshold for the tile. In this case, when the object covers the whole tile, and the minimum depth for the object is greater than the minimum depth threshold for the tile, the minimum depth threshold for the tile is updated to the larger value. Similar modifications can be made to the operations of FIG. 4 for additional depth compare modes.

In another embodiment, each object that is rendered has its own depth compare mode. While it is likely that the majority of objects in a scene will use a similar depth compare mode, for natural looking hidden surface removal, the ability to change depth compare mode enables a variety of special effects. The culling test is adapted for each object, according to the object's depth compare mode, such that an object is culled only when comparison with the appropriate tile depth threshold indicates that it will not be rendered. Since the depth compare mode may change from one object to the next, both minimum and maximum depth threshold values are maintained for each tile. Accordingly, the depth threshold updates are adapted according to the depth compare mode of the objects, such that the minimum and maximum threshold values maintain conservative bounds on the range of depth values that the depth buffer may contain after the object has been rendered.

Table 1 shows eight common depth compare modes, and the corresponding cull conditions and depth threshold updates that are required. 'obmin' and 'obmax' represent the minimum and maximum depth of an object, and 1 min' and 1max' represent the minimum and maximum depth threshold values for a tile or region of the screen. min( ) and max( ) are functions that return the minimum or maximum values of their arguments respectively. Note that while, in the case of a "less than" depth compare mode, the maximum depth threshold update requires that an object covers the entire tile, the minimum depth threshold is updated for all objects. Similarly, in the case of a "greater than" compare mode, the minimum depth threshold update requires that an object covers the entire tile, but the maximum depth threshold is updated for all objects.

The "never" depth compare mode is an unusual case. An object with this depth compare mode will never update the depth buffer, and will never be visible in the rendered output. Consequently, the depth thresholds do not need to be updated. It might appear that such an object could always be culled. It must, however, be assumed that the object was included in the display list for good reason. It may, for example, have side-effects not related to the depth buffer. In general, the culling system should be aware of objects with side-effects, and not cull them.

TABLE 1

Depth Compare Modes

| Depth Compare Mode | Cull Condition | Min Threshold Update | Max Threshold Update |
| --- | --- | --- | --- |
| Less Than | obmin >= tmax | tmin = min(obmin, tmin) | Full coverage of tile AND tmax = min(obmax, tmax) |
| Less Than or Equal | obmin > tmax | | |
| Greater Than | obmax <= tmin | Full coverage of tile AND. tmin = max(obmin, tmin) | tmax = max(obmax, tmax) |
| Greater Than or Equal | obmax < tmin | | |
| Equal | obmin > tmax or obmax < tmin | — | — |
| Not Equal | never | tmin = min(obmin, tmin) | tmax = max(obmax, tmax) |
| Always | | | |
| Never | (see text) | — | — |

A flowchart of an example method of culling objects and updating the depth thresholds where multiple depth compare modes are supported. Object data for a tile is received/read, and the depth compare mode associated with that object is read. Depth values for the object are determined and the depth thresholds for the tile are read, as described above with reference to FIG. 4. These steps can be performed in any order, or in parallel.

The data from these steps is provided to the object culling logic 50 and depth update logic 55. Considering first the object culling logic 50, this operates in a similar manner to that described above in connection with FIG. 4. However, the culling test is now dependent on the depth compare mode associated with the object. The object culling logic 50 determines whether the culling conditions are met for the depth compare mode in question. The culling conditions for a given depth compare mode are illustrated above in Table 1. If it is determined that the culling conditions are met, then the object can be culled, and hence is not indicated in the display list for the tile. Conversely, if it is determined that the culling conditions are not met, then the object cannot safely be culled, and hence the object is indicated in the display list for the tile.

Considering now the depth update logic 55, because multiple depth compare modes are supported, both the maximum and minimum depth thresholds are maintained for the tile. In this example, these are updated in two parallel tracks, although in other examples these calculations can be performed sequentially and in any suitable order. It is determined whether the conditions for updating maximum depth threshold for the depth compare mode of the object are met. The maximum depth threshold update conditions for a given depth compare mode are illustrated above in Table 1. If the conditions for updating maximum depth threshold for the depth compare mode of the object are met, then the maximum depth threshold is updated, and, if not, then the maximum depth threshold is not updated.

Similarly, for the minimum depth threshold, it is determined whether the conditions for updating minimum depth threshold for the depth compare mode of the object are met. The minimum depth threshold update conditions for a given depth compare mode are illustrated above in Table 1. If the conditions for updating minimum depth threshold for the depth compare mode of the object are met, then the minimum depth threshold is updated, and, if not, then the minimum depth threshold is not updated. The process in FIG. 6 is repeated for each object in a tile. Note that although the operations performed by the object culling logic 50 and depth update logic 55 are shown being performed in parallel, in other examples they can be performed sequentially.

An embodiment of the present invention will now be described with respect to FIG. 7.

Figure 8:
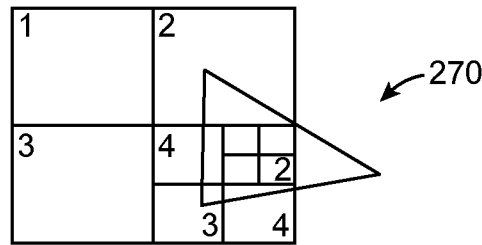
FIG. 8 is a flow chart showing a preferred embodiment of the invention.

In this embodiment, at step 230, a tile is divided into a plurality of smaller regions, denoted areas herein. In this example, as illustrated in FIG. 8, tile 4 comprising 16×16 pixels is divided into four rectangular areas, labelled a, b, c and d, each comprising 8×8 pixels. However, the tile may be divided into a different number of areas which may be various shapes and sizes. Each area comprises a plurality of image pixels.

Referring to FIG. 3, in addition to storing a maximum depth threshold for each tile in memory device 60, maximum and/or minimum depth thresholds (depending on the depth compare modes supported) for each of the plurality of areas of at least one of the tiles are stored in memory device 70. In one example, the memory device 70 is a small/fast memory which is not large enough to store all of the area depth thresholds for all of the tiles, and operates in a similar manner to a cache for the tile depth thresholds, but at the resolution of the areas. In the first instance the maximum and/or minimum depth threshold for each of the areas of a tile is set to the maximum and/or minimum depth threshold of the tile stored in memory device 60.

Figure 7:
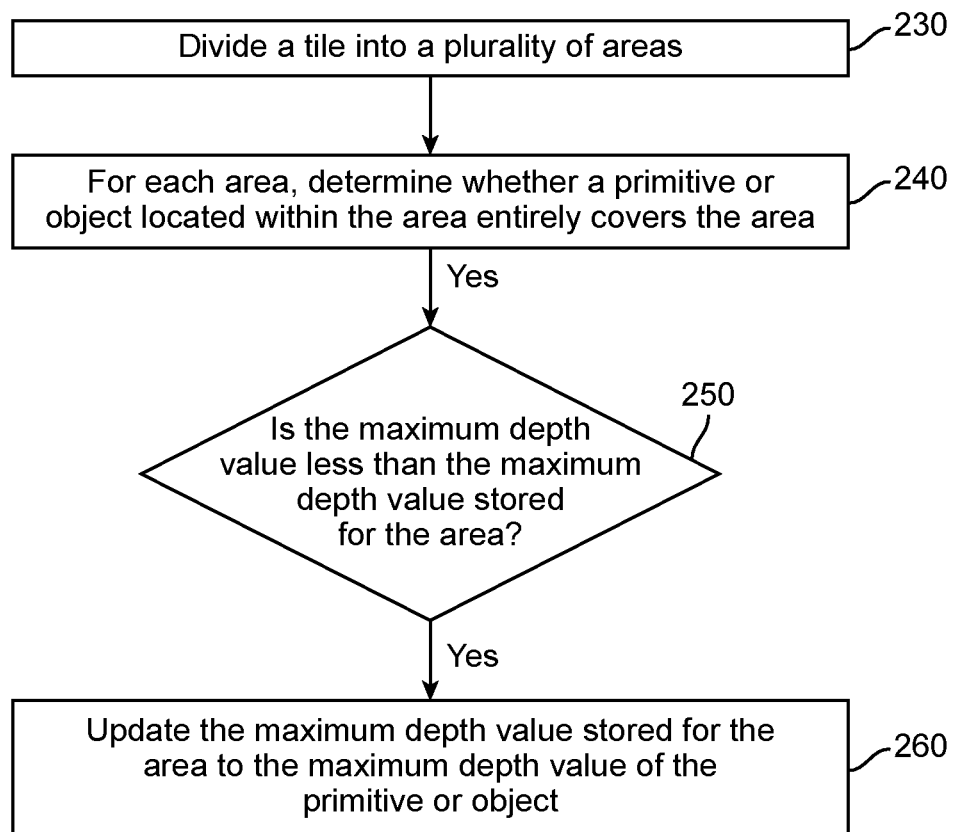
FIG. 7 is a flow chart showing a preferred embodiment of the invention.

Referring to FIG. 7, similarly to the embodiment described above for updating the tile depth thresholds using the depth update logic 55, but for each area of the tile, it is determined at step 240 whether an object covers the entire area. For example, whether all the corner points of the area boundaries are located inside the object. In some examples, the corner points can be corner pixel sample points, and in other examples the corner points can be halfway points between pixel sampling points, or any other set of corner points that gives a more conservative test than the corner sample points. In the example shown in FIG. 8, it is seen that object 270 covers area b. In the illustrative example of a "less than" depth compare mode, it is then determined at step 250 whether the object has a maximum depth value closer to the viewpoint than the maximum depth threshold for that area of the tile stored in memory device 70. If so, then at step 260 the maximum depth threshold of that area of the tile stored in memory device 70 is updated to the maximum depth value of that object. Again, it will be appreciated that steps 240 and 250 may be performed in either order or in parallel.

Since an object is more likely to cover at least one of the areas of a tile than the entire tile, it will be appreciated that using this method the maximum depth threshold for each of the areas of a tile may be updated more frequently than the maximum depth threshold of the tile.

In the illustrative example of a "less than" depth compare mode, this updated maximum depth threshold may be used to cull objects, which might have passed the depth test based on the maximum depth threshold of the entire tile.

Figure 9:
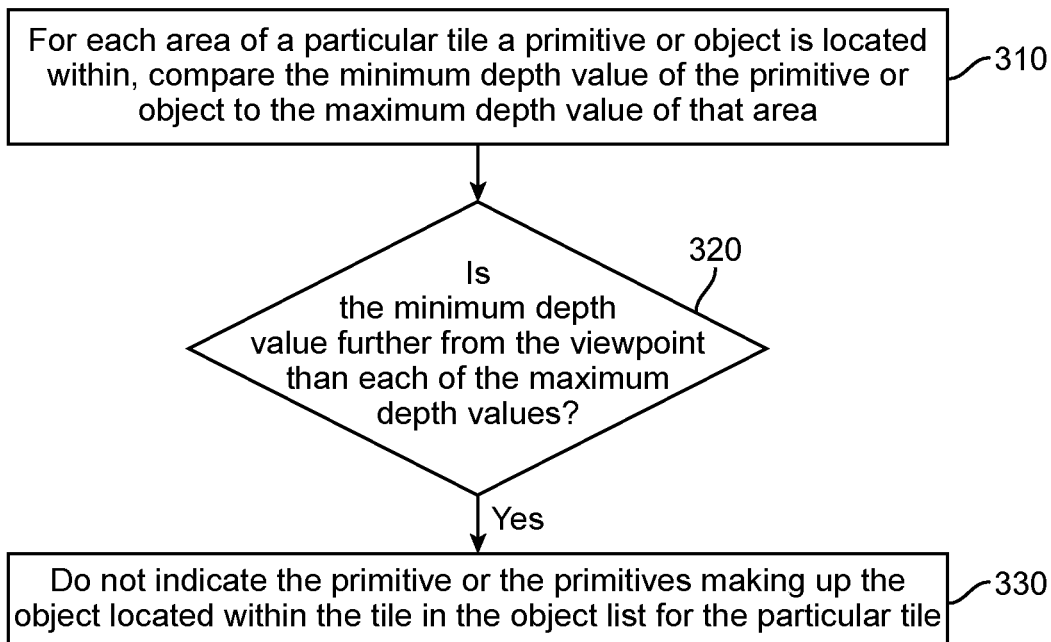
FIG. 9 is a diagram illustrating the depth information stored in memory in a preferred embodiment of the invention.

Referring to FIG. 9 at step 310, for each area of a particular tile an object is located at least partially within, the minimum depth value of that object is compared to the maximum depth threshold of the area. Then, at step 320, it is determined whether the minimum depth value of that object is greater than (i.e. further from the viewpoint than) each of those maximum depth thresholds (i.e. the maximum depth thresholds of all the areas of the tile the object is located within). If so, at step 330 that primitive or object is culled from the tile and the primitive or the primitives making up the object located within that tile are not indicated in the display list for that tile. If not, at step 335, the primitive or primitives making up the object are indicated in the display list for that tile.

In an alternative embodiment, rather than considering the overall minimum depth of the object in FIG. 9, the minimum depth of the object per-area can be used to compare with the depth thresholds for the respective area.

Figure 10:
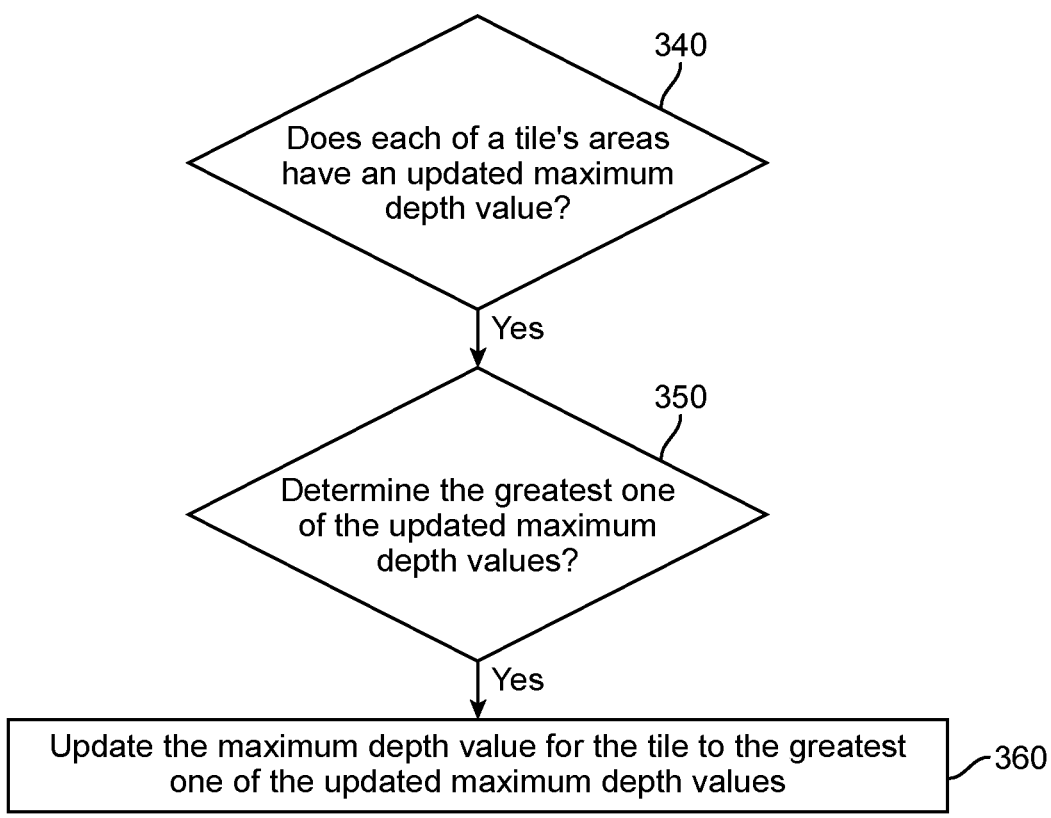
FIG. 10 is a flow chart showing a preferred embodiment of the invention.

Furthermore, once the greatest one of the maximum depth thresholds from all the areas of a particular tile has been updated, the maximum depth threshold of the tile can be updated. Referring to FIG. 10, at step 340 it is determined whether at least one of a tile's areas has an updated maximum depth threshold. If so, at step 350 the greatest one of the updated maximum depth thresholds (i.e. the depth furthest from the viewpoint) is determined. At step 360, the maximum depth threshold of the tile is updated to this greatest one of the updated maximum depth thresholds of the tile's areas. The greatest one of the maximum depth thresholds may be written from memory device 70 to memory device 60. Note that step 340 is optional and can be omitted, as the result is the same. However, including step 340 can save some operations when an update is not needed.

The maximum depth threshold of the tile may be updated each time the greatest one of the maximum depth thresholds of a tile's areas have been updated. Alternatively, the maximum depth threshold of the tile may be updated less frequently to save memory bandwidth. For example, where the tile area memory is small and acting like a cache for the maximum depth thresholds, the maximum depth threshold of the tile may only be updated just before the data for those areas is evicted from the tile area memory.

FIG. 8 illustrates the data stored in the memory devices 60 and 70. The data stored in tile depth memory device 60 is indicated at 280. In this example, minimum and maximum depth data is stored for each of the tiles in the image. The data stored in tile area depth memory device 70 for tile 4 is indicated at 290. In this example, minimum and maximum depth data is stored for each of the areas of tile 4. It is indicated that the data for area b has been updated. It should be noted that even if minimum and/or maximum depth data is not yet available for each tile, memory space is typically assigned for that data in memory device 60.

In one example, the minimum and/or maximum depth data for the areas of a particular tile can be stored temporarily, rather than being written to memory. In this example, at any one time area depth data may only be stored in memory device 70 for a fraction or subset of the total number of tiles in the image. It will be appreciated that if depth data were stored for each area of each tile, the amount of depth data which needs to be stored will be increased by at least three times (if each tile is divided into two areas). In the example described where the tile is divided into four areas, the amount of depth data which needs to be stored is increased by five times. Thus, this example enables the amount of memory space required to be limited whilst improving the effectiveness of the depth cull.

As mentioned above, objects are processed sequentially and consecutively processed objects may be located in different tiles. In general, it is not known which tile an object will be located within until it has been processed.

Where an object is located within a different tile to the previously processed object, this may evict area depth data for another tile from the tile area memory to make space for area depth data for that tile.

The tile area memory may operate based on a simple first in/first out policy. However, more preferably, which tile's areas are evicted from the memory is determined dependent on the amount of information which will be lost. For example, if the maximum depth of the tile has recently been updated using the maximum depths of that tile's areas, or if the greatest one of the maximum depths of a tile's areas have been updated such that the maximum depth threshold for the tile can be updated before the tile's areas are evicted, the depth data for those tile's areas can be evicted without losing all of the information stored in the tile area memory. If, however, the greatest one of the maximum depths of a tile's areas has not been updated, but the maximum depths in some of a tile's other areas have been updated, then evicting those areas would result in that information being lost before it can be used to update the maximum depth threshold for the tile. Which tile's areas are evicted may therefore be determined based on how many of the depth thresholds of the areas of each tile have not been updated. Those tiles that have had no areas updated can be evicted with no loss of information, and these can therefore be preferentially selected for eviction. Those tiles which only have a few areas still to be updated may be less likely to be evicted.

The determination may also take into account the difference between the maximum depth thresholds of each of the areas of a particular tile. If there is a large difference between the maximum depth thresholds of one or more of the areas, then the areas of that tile may be retained in the memory in the expectation that a subsequent update will reduce the difference and allow the maximum depth threshold for the tile to be updated by a large amount. Or, if all of the areas have already been updated, in the expectation that when the other areas are updated again the maximum depth threshold for the tile may be updated by a large amount.

In a further embodiment of the invention, each of one or more of the areas of a particular tile are also divided into a plurality of even smaller regions, denoted sub areas herein. For illustration purposes, in FIG. 8, area b is divided into four equal, rectangular sub areas, each comprising 4×4 pixels. However, again, it will be appreciated that the area may be divided into a different number of sub areas, which may be various shapes and sizes. Each sub area comprises a plurality of pixels. FIG. 8 also shows the information in the tile sub depth area memory which may also be stored in memory device 70. The tile sub area depth data may be stored in the same memory or a different memory to the tile area depth data. For tile 4, area b, minimum and/or maximum depth data is stored for each of area b's sub areas.

Figure 11:
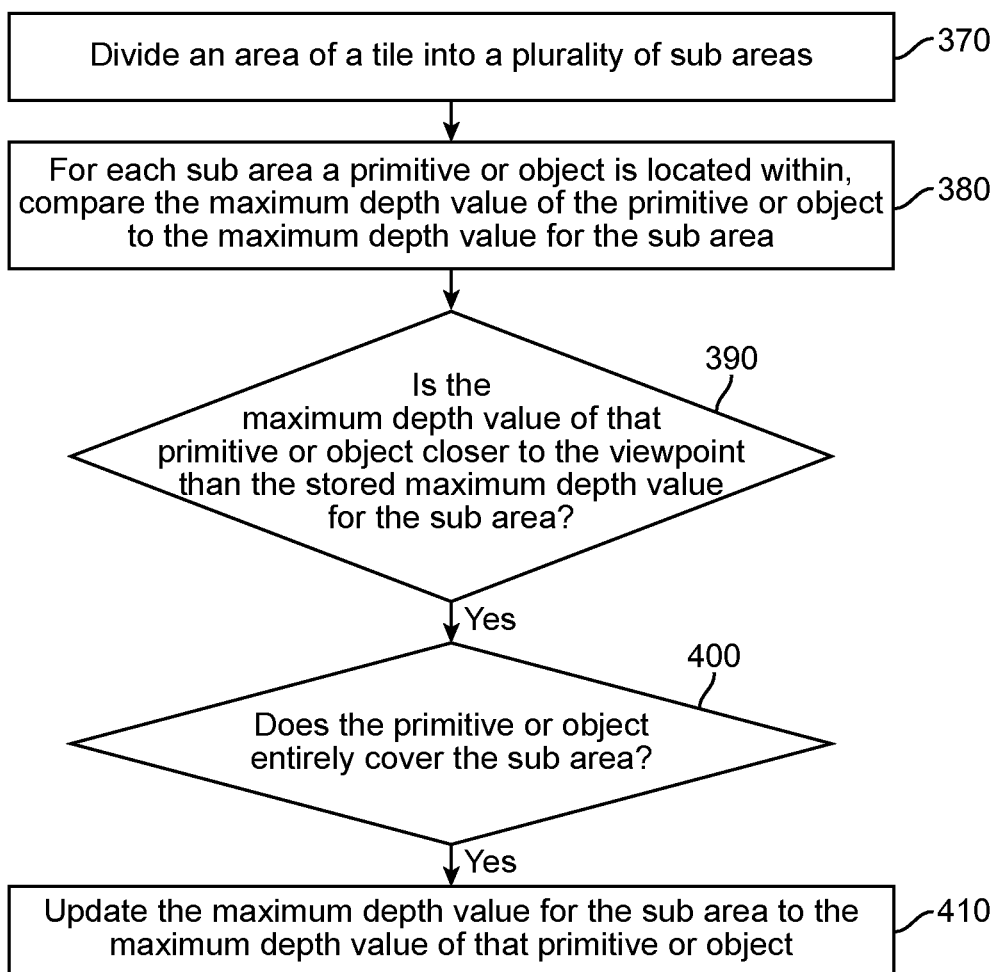
FIG. 11 is a flow chart showing a preferred embodiment of the invention.

FIG. 11 illustrates how the maximum depth threshold of a sub area is updated. Again, similarly to the embodiment described above, at step 370 an area of a tile is divided into a plurality of sub areas. Then, at step 380, for each sub area an object is located within, the maximum depth of the primitive or object is compared with the maximum depth threshold of that sub area stored in memory device 70. Initially, the maximum depth threshold of each sub area is set to the maximum depth threshold of the associated tile area stored in memory device 70. If it is determined at step 390 that the maximum depth value of that object is closer to the viewpoint than the stored maximum depth threshold for that sub area, then at step 400 it is determined whether that object entirely covers the sub area. That is, whether all the corner points of the sub area boundaries are located inside the object. If so, at step 410 the maximum depth threshold of that sub area is updated to or replaced with the maximum depth value of that object. Again, steps 380/390 and step 400 may be performed in the opposite order or in parallel.

The maximum depth threshold of the sub area may now be used to cull objects which would pass the depth test based on the maximum depth threshold stored for the tile and for the associated tile area (to which that sub area belongs), using a method similar to that described above.

Figure 12:
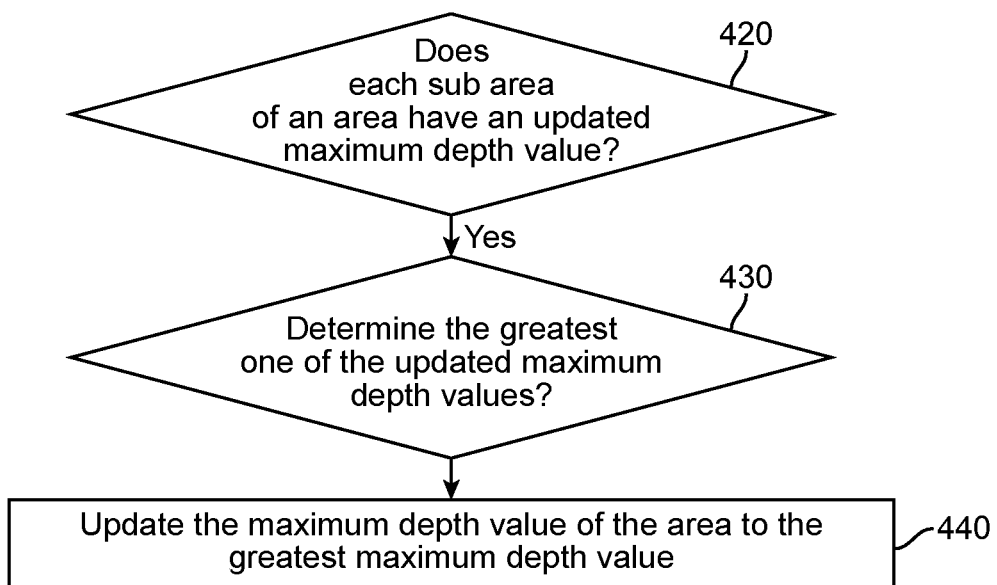
FIG. 12 is a flow chart showing a preferred embodiment of the invention.

Once the greatest one of the maximum depth thresholds of the sub areas of an area have been updated, the greatest one of the maximum depth thresholds of those sub areas can be used to update the maximum depth threshold of that area of the tile. Referring to FIG. 12, similarly to the embodiment described above, at step 420 it is optionally determined whether at least one of the sub areas of an area has an updated maximum depth threshold. If so, at step 430 the greatest one of the updated maximum depth thresholds is determined. That is, the value furthest from the viewpoint. Then, at step 440, the maximum depth threshold of the area is updated to that greatest one of the updated maximum depth thresholds.

Again, the maximum depth threshold of the area may be updated each time the greatest one of the maximum depth thresholds of that area's sub areas have been updated. Alternatively, the maximum depth threshold of the tile area may be updated less frequently, for example just before the data for those sub areas is evicted from the memory. The updated maximum depth threshold of the area may, in turn, be used to update the maximum depth threshold of the tile, as described above.

What is claimed is:

1. In a tile-based graphics system having a processor configured to perform a render by implementing two processes: (i) a tiling process to derive a display list for each of a plurality of tiles and cause the derived display lists to be stored, and (ii) a rendering process to retrieve the stored display lists and render the tiles using the respective display lists, the improvement comprising:

for each of one or more regions of a tile, as part of the tiling process determining whether to include an indication of an object in a display list for the tile in dependence on the result of at least one of one or more comparisons of depth values for said object with a depth value associated with the region, for each of the one or more regions of the tile;

for each of the one or more regions of the tile, updating the depth value associated with the region in dependence on the result of at least one of the comparisons; and outputting the display list for the tile to a memory for subsequent retrieval by the rendering process.

2. The improvement to a tile-based graphics system as set forth in claim 1, wherein the object comprises a single primitive, a plurality of primitives or a patch of surface data.

3. The improvement to a tile-based graphics system as set forth in claim 1, wherein the one or more comparisons between the depth values for the object and the depth value associated with the region comprise a comparison between a minimum depth value for the object and a maximum depth value associated with the region.

4. The improvement to a tile-based graphics system as set forth in claim 1, further comprising updating the depth value associated with the region in dependence on the result of the at least one of the one or more comparisons if the object entirely covers the region, and wherein the step of updating the depth value associated with the region in dependence on the result of the at least one of the one or more comparisons comprises updating the maximum depth value associated with the region if a maximum depth value for the object is less than the maximum depth value associated with the region.

5. The improvement to a tile-based graphics system as set forth in claim 1, further comprising updating the depth value associated with the region in dependence on the result of at least one of the one or more comparisons if the object entirely covers the region, and wherein updating the depth value associated with the region in dependence on the result of the at least one of the one or more comparisons comprises updating the minimum depth value associated with the region if the minimum depth value for the object is greater than the minimum depth value associated with the region.

6. The improvement to a tile-based graphics system as set forth in claim 1, wherein depth values for the object are derived by, for each region within which the object is located, deriving a depth value for the respective part of the object within that region.

7. The improvement to a tile-based graphics system as set forth in claim 1, wherein the tile comprises a single region.

8. The improvement to a tile-based graphics system as set forth in claim 1, wherein the tile comprises a plurality of regions.

9. The improvement to a tile-based graphics system as set forth in claim 8, wherein determining whether to include an indication of the object in the display list for the tile in dependence on the result of the at least one of the one or more comparisons for each of the regions of the tile comprises, for each of the regions of the tile within which the object is located, comparing a depth value for the object to the depth value associated with that region.

10. The improvement to a tile-based graphics system as set forth in claim 8, wherein the processor is further configured to determine a depth value associated with the tile based on the depth value associated with each of the regions of the tile; and write the depth value associated with the tile to a memory.

11. The improvement to a tile-based graphics system as set forth in claim 10, wherein determining the depth value associated with the tile based on the depth value associated with each of the regions of the tile comprises determining the greatest of the depth values associated with the regions of the tile; and setting the depth value associated with the tile to a value equal to or greater than the greatest of the depth values associated with the regions of the tile.

12. The improvement to a tile-based graphics system as set forth in claim 10, wherein determining the depth value associated with the tile based on the depth value associated with each of the regions of the tile comprises determining the smallest of the depth values associated with the regions of the tile and setting the depth value associated with the tile to a value equal to or smaller than the smallest of the depth value associated with the regions of the tile.

13. The improvement to a tile-based graphics system as set forth in claim 8, wherein a first plurality of the plurality of regions is a plurality of sub regions into which a first portion of the tile is subdivided, and wherein the processor is further configured to determine a depth value associated with the first portion of the tile based on the depth value associated with each of the sub regions; and write the depth value associated with the first portion of the tile to a memory.

14. The improvement to a tile-based graphics system as set forth in claim 1, wherein the depth values associated with the one or more regions are written to a memory for temporarily storing data.

15. In a method in a tile-based graphics system of performing a render by implementing two processes: (i) a tiling process to derive a display list for each of a plurality of tiles and cause the derived display lists to be stored, and (ii) a rendering process to retrieve the stored display lists and render the tiles using the respective display lists, the improvement comprising:

for each of one or more regions of a tile, as part of the tiling process, determining whether to include an indication of an object in the display list for the tile in dependence on the result of at least one of one or more comparisons of depth values for said object with a depth value associated with the region, for each of the one or more regions of the tile;

for each of the one or more regions of the tile, updating the depth value associated with the region in dependence on the result of at least one of the comparisons; and outputting the display list for the tile for storage in a memory for subsequent retrieval by the rendering process.

16. The improvement to a method in a tile-based graphics system as set forth in claim 15, wherein the object comprises a single primitive, a plurality of primitives or a patch of surface data.

17. The improvement to a method in a tile-based graphics system as set forth in claim 15, wherein comparisons between the depth values for the object and the depth value associated with the region comprise a comparison between a minimum depth value for the object and a maximum depth value associated with the region.

18. The improvement to a method in a tile-based graphics system as set forth in claim 15, further comprising updating the depth value associated with the region in dependence on the result of at least one of the one or more comparisons if the object entirely covers the region, and wherein the step of updating the depth value associated with the region in dependence on the result of the at least one of the one or more comparisons comprises updating the maximum depth value associated with the region if a maximum depth value for the object is less than the maximum depth value associated with the region.

19. The improvement to a method in a tile-based graphics system as set forth in claim 15, further comprising updating the depth value associated with the region in dependence on the result of at least one of the one or more comparisons if the object entirely covers the region, and wherein updating the depth value associated with the region in dependence on the result of the at least one of the one or more comparisons comprises updating a minimum depth value associated with the region if the minimum depth value for the object is greater than the minimum depth value associated with the region.

20. The improvement to a method in a tile-based graphics system as set forth in claim 15, wherein depth values for the object are derived by, for each region within which the object is located, deriving a depth value for the respective part of the object within that region.

* * * * *